United States Patent [19]

Bloch

[11] Patent Number: 4,761,955
[45] Date of Patent: Aug. 9, 1988

[54] ROTARY ACTUATOR UTILIZING A SHAPE MEMORY ALLOY

[75] Inventor: Joseph T. Bloch, Seattle, Wash.

[73] Assignee: The Boeing Company, Seattle, Wash.

[21] Appl. No.: 74,049

[22] Filed: Jul. 16, 1987

[51] Int. Cl.⁴ .............................................. F03G 7/06
[52] U.S. Cl. ....................................... 60/528; 60/527
[58] Field of Search ........................... 60/527, 528, 529

[56] References Cited

U.S. PATENT DOCUMENTS

| | | |
|---|---|---|
| 3,445,898 | 5/1969 | Goodrich . |
| 3,622,941 | 11/1971 | Wetmore . |
| 3,740,839 | 6/1973 | Otte et al. . |
| 4,002,954 | 1/1977 | Orlando . |
| 4,275,561 | 6/1981 | Wang ................................. 60/527 |
| 4,472,939 | 9/1984 | Wang ................................. 60/527 |
| 4,497,527 | 2/1985 | Cameron . |
| 4,556,050 | 12/1985 | Hodgson et al. . |

Primary Examiner—Stephen F. Husar
Attorney, Agent, or Firm—Foley & Lardner, Schwartz, Jeffery, Schwaab, Mack, Blumenthal & Evans

[57] ABSTRACT

A simple, lightweight, compact and easily fabricated rotary actuator is provided that utilizes a shape memory alloy as an operative part thereof. The shaped memory alloy is wrapped around an accumulator, with one end of the wire attached to a point fixed with respect to the rotary accumulator and the other end attached to the accumulator itself. The wire contracts when heated forcing the accumulator to rotate.

20 Claims, 2 Drawing Sheets

ROTARY ACTUATOR UTILIZING A SHAPE MEMORY ALLOY

BACKGROUND OF THE INVENTION

The present invention is directed toward a rotary actuator that utilizes a shape memory alloy as an operative component thereof.

Various types of devices have been proposed that utilize a heat recoverable metal, such as Nitinol, as an operative component of the device. Nitinol is an electrically conductive alloy containing large proportions of nickel and titanium. A Nitinol wire, for example, may be stretched up to about 10% of its length and will remain in the stretched state even when the tensile stress used to stretch the wire is removed. If the temperature of the wire is then elevated above its martensitic critical temperature, the wire will return to its original unstretched state as if it has a "memory" of it unstretched length.

When the wire contracts to its original length it exerts a contracting force which has been used in various applications. Co-pending U.S. patent application Ser. No. 946,480 discloses a gripping device wherein linear actuation is provided by the contracting force of the Nitinol wire. U.S. Pat. No. 4,002,954 discloses the utilization of a Nitinol wire for activating a photographic shutter and sets forth a particular electronic circuit arrangement to provide a current pulse sufficient to heat the Nitinol wire to the critical temperature. U.S. Pat. Nos. 3,740,839 and 4,497,527 disclose connecting devices utilizing a socket member with several tines and a band positioned over the tines for biasing them toward their center in a contracted state of the band. The band is made of a heat recoverable metallic material. Additional teachings of heat shrinkage and heat recoverable material may be found in U.S. Pat. Nos. 3,445,898, 3,622,941 and 4,556,050.

SUMMARY OF THE INVENTION

The object of the present invention is to provide a simple, lightweight, compact and easily fabricated rotary actuator that utilizes a shape memory alloy as an operative part thereof.

It is a further object of the invention to provide a relatively inexpensive rotary actuator that utilizes a shape memory alloy, which is suitable for use in space applications.

Yet another object of the invention is to provide a rotary actuator utilizing a shape memory alloy in which electrical current may be passed through the shape memory alloy to thereby heat it and cause the alloy to contract, thereby providing a rotary actuation function.

A still further object of the invention is to provide a rotary actuator utilizing a shape memory alloy in which the angle of rotation of the rotary actuator can be adjusted.

The invention is directed to a rotary actuator which comprises a rotary accumulator means for accumulating a length of a shape memory alloy wire; a shape memory alloy wire attached at one end to a fixed point and attached at a second end to said rotary accumulator means; biasing means for biasing said rotary accumulator means to a first position; and means for heating said shape memory alloy wire to cause said shape memory alloy wire to contract, thereby rotating said rotary accumulator means from said first position to a second position.

Other objects and advantages of the invention will become apparent with reference to the description of the preferred embodiments contained herein.

BRIEF DESCRIPTION OF THE DRAWINGS

With the above as background, reference should now be made to the following figures for a detailed description of the invention.

DETAILED DESCRIPTION OF THE PREFERRED EMBODIMENTS

Figure 1:
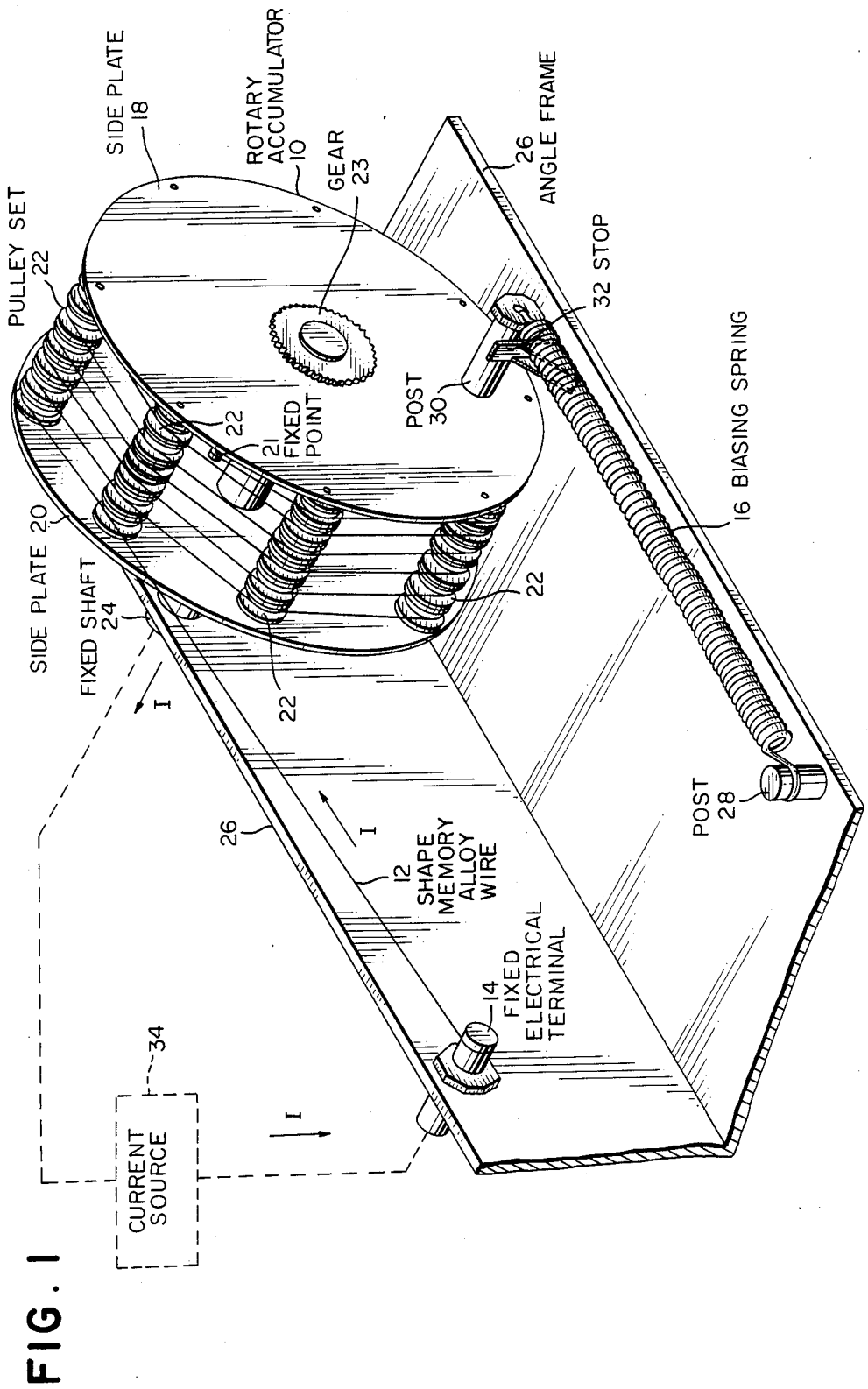
FIG. 1 is a perspective view of a rotary actuator in accordance with the present invention.

Referring now to FIG. 1, a rotary actuator according to the present invention is shown having a rotary accumulator 10, a shape memory alloy wire 12, a fixed electrical terminal 14, and a biasing spring 16. The rotary accumulator 10 is composed of two circular side plates 18, 20 and six sets of pulleys 22 mounted equally spaced between the side plates 18 and 20. The rotary accumulator 10 is freely mounted on fixed shaft 24 which in turn is mounted to an angle frame 26. The side plates 18, 20 and fixed shaft 24 are composed of an electrically conductive material. The alloy wire 12 is connected at one end to the fixed electrical terminal 14 which is attached to the angle frame 26 and electrically isolated therefrom by utilizing, for example, an insulating sleeve, not shown. The alloy wire 12 is then wrapped around the six sets of pulleys 22 of the rotary accumulator 10 and the second end of the wire is connected to one of the side plates 18, 20 at a fixed point 21. The biasing spring 16 is attached at one end to a post 28 that is mounted on the angle frame 26, and the other end of the biasing spring 16 is attached to a second post 30 that is connected to the side plate 18 of the rotary accumulator 10. The biasing spring 16 holds the rotary accumulator at a first position where the post 30 contacts the stop 32 located on the frame 26.

Figure 2:
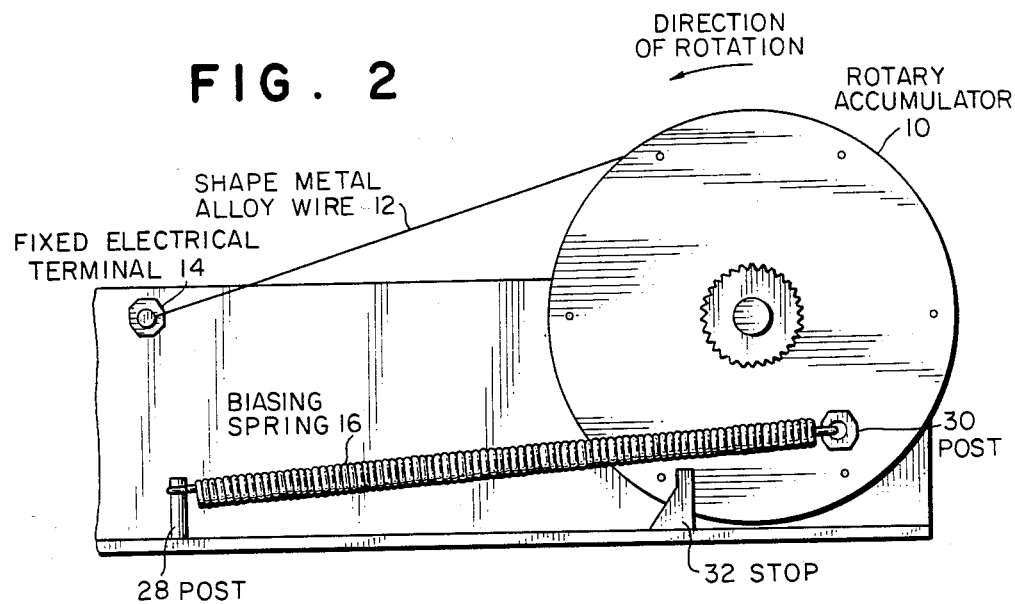
FIG. 2 is a side view of the rotary actuator shown in FIG. 1 when the rotary actuator is activated.

To operate the rotary actuator shown in FIG. 1, a current I is passed from a current source 34 through the fixed terminal 14, the alloy wire 12, the side plate 18, the fixed shaft 24 and back to the current source 34. The current I passing through the alloy wire 12 heats the wire to its critical temperature causing the alloy wire to contract. As the alloy wire 12 contracts, it pulls on the side plate 18 of the rotary accumulator 10 causing the entire rotary accumulator 10 to rotate as shown in FIG. 2. The degree of rotation depends upon the length of the alloy wire 12 wrapped around the pulleys 22 of the accumulator 10. The size of the accumulator 10 or the overall length of the path of the alloy wire 12 may be selected to achieve the desired degree of rotation. Nitinol wire, which can be used for the alloy wire 12, contracts to about 8-10% of its total length. Thus, the larger the path length dictated by the rotary accumulator, the larger the amount of "shrinkage" of the Nitinol wire (in absolute terms) and the greater the degree of rotation.

The rotary accumulator 10 can include a variety of means to transmit the rotary motion of the rotary accumulator to actuate other devices. For example, a link mechanism can be attached directly to one of the side plates 18, 20 of the rotary accumulator 10 such that the rotation of the rotary accumulator 10 causes movement of the link mechanism. Similarly, a gear 23 could be attached to the side plates 18, 20 (as shown in FIG. 1) that would drive another gear directly or indirectly through a chain linkage. Also, the rotary accumulator 10 can be fixed to a freely rotating shaft, instead of rotatably mounted to the fixed shaft 24, so that the rotation of the rotary accumulator 10 also rotates the shaft.

Figure 3:
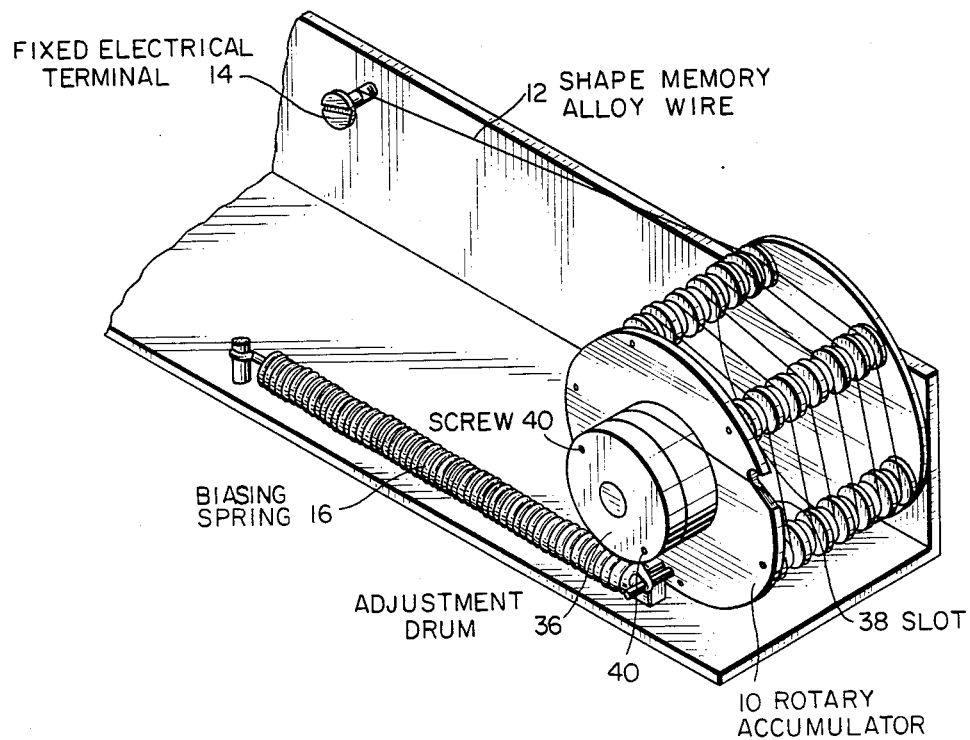
FIG. 3 is a perspective view of a further embodiment of the invention shown in FIG. 1.

Referring now to FIG. 3, a rotary actuator according to the present invention is shown having means for adjusting the degree of rotation of the rotary accumulator 10. A portion of the alloy wire 12 is unwrapped from the rotary accumulator 10, and rewrapped once or more around an adjustment drum 36 with an end of the alloy wire fixed to the adjustment drum. A slot 38 in the side plate of the rotary accumulator 10 provides a guide path for the alloy wire 12 as it leaves the rotary accumulator. The adjustment drum 36 is mounted to the rotary accumulator 10 with screws 40 so that it can be easily removed.

The provision of the adjustment drum 36 permits the degree of rotation of the rotary accumulator to be varied, as the degree of rotation is proportional to the ratio of the diameter of the rotary accumulator 10 and the diameter of the adjustment drum 36. Different diameter adjustment drums, larger or smaller than the diameter of the rotary accumulator, may be employed to achieve the desired degree of revolution. Thus, the adjustment drum 36 provides a variable element instead of requiring the manufacture of accumulators having different diameters or different number of windings.

The embodiment shown in FIG. 3 employs a fixed length of alloy wire 12. The alloy wire 12 must be unwrapped from the rotary accumulator 10 before being rewrapped on the adjustment drum 36. However, a second embodiment employing the adjustment drum 36 is also possible in which the terminal 14 is a screw type terminal that allows the length of the alloy wire 12 to be varied. The terminal 14 is loosened to permit additional alloy wire 12 to be wrapped around the adjustment drum 36 and then tightened to secure the wire. The increase in the path length of the alloy wire 12 causes an increase in the degree of rotation of the rotary accumulator 10 when the alloy wire 12 contracts. Different degrees of rotation can be obtained by attaching different adjustment drums having varying diameters.

The torque available from the rotation of the rotary accumulator 10 is a function of the thickness of the alloy wire employed. An increase in the wire thickness to achieve an increase in torque, however, requires a larger current to achieve the same heating rate as for a smaller diameter wire.

Although the invention has been described with reference to certain preferred embodiments thereof, it is evident to those of skill in the art that various modifications and improvements may be made without departing from the spirit and scope of the invention. For example, although an electrical current was utilized to heat the alloy wire to its critical temperature, other means such as radiant heating may be employed. Also, the disclosed embodiment employs a spring to bias the resetting of the rotary actuator, however, other biasing means may be employed such as a mechanical drive, a hydraulic drive, or a rotary actuator of the type described herein but employing an alloy side wound in an opposite direction to provide the requisite biasing.

What is claimed is:
1. An apparatus comprising:
   (a) rotary accumulator means for accumulating a length of a shape memory alloy wire;
   (b) said shape memory alloy wire attached at one end to a point fixed with respect to said rotary accumulator means and attached at a second end to said rotary accumulator means;
   (c) biasing means for biasing said rotary accumulator means to a first position; and
   (d) means for heating said shape memory alloy wire to cause said shape memory alloy wire to contract, thereby rotating said rotary accumulator means from said first position to a second position.

2. An apparatus as claimed in claim 1, wherein said means for heating comprises means for providing an electrical current path through said shape memory alloy wire.

3. An apparatus as claimed in claim 1, wherein said rotary accumulator means comprises:
   (a) first and second side plates; and
   (b) a plurality of pulley sets mounted between said first and second side plates.

4. An apparatus as claimed in claim 1, wherein said biasing means comprises a spring.

5. An apparatus as claimed in claim 1, wherein said rotary accumulator is rotatable mounted on a fixed shaft.

6. An apparatus as claimed in claim 1, wherein said rotary accumulator is fixedly mounted to a rotatable shaft.

7. An apparatus as claimed in claim 1, further comprising adjustment means for adjusting the path length of said shaped memory alloy.

8. An apparatus as claimed in claim 7, wherein said adjustment means comprises an adjustment drum detachably mounted to said rotary accumulator means wherein said shaped metal alloy wire is wrapped a plurality of times around said adjustment drum and said rotary accumulator means.

9. An apparatus as claimed in claim 1, further comprising means for transferring the rotary motion of said rotary accumulator to an external device.

10. A rotary actuator comprising:
    (a) a fixed electrical terminal;
    (b) rotary accumulator means for accumulating a length of a shape memory alloy wire;
    (c) said shape memory alloy wire having a first end connected to said fixed electrical terminal and a second end connected to a fixed point on said rotary accumulator means;
    (d) biasing means for biasing said rotary accumulator to a first point; and
    (e) means for providing a current path from said fixed electrical terminal through said shape memory alloy wire.

11. A rotary actuator as claimed in claim 10, wherein said rotary accumulator means comprises:
    (a) first and second side plates; and
    (b) a plurality of pulley sets mounted between said first and second side plates.

12. A rotary actuator as claimed in claim 11, wherein said second end of said shape memory alloy wire is connected to a fixed point on a least one of said first and second side plates.

13. A rotary actuator as claimed in claim 10, further comprising adjustment means for adjusting the path length of said shaped memory alloy.

14. A rotary actuator as claimed in claim 13, wherein said adjustment means comprises an adjustment drum detachably mounted to said rotary accumulator means wherein said shaped metal alloy wire is wrapped a plurality of times around said adjustment drum and said rotary accumulator means.

15. A method for rotating a member, comprising the steps of:
   (a) rotatably mounting said member to a base to define an axis of rotation;
   (b) connecting a memory metal wire to said member;
   (c) forming a helical spiral of said wire about said member and said axis of rotation; and
   (d) shrinking said wire to rotate said member from a first position to a rotated position in a first rotational direction.

16. The method of claim 15 further comprising the step of:
   resetting said member by stretching said wire by rotating said member back to said first position in a second, rotational direction opposite to said first rotational direction.

17. The method of claim 15 wherein said step of shrinking said wire includes passing an electrical current through said wire to heat said wire.

18. The method of claim 16 wherein said step of shrinking said wire includes passing an electrical current through said wire and wherein said step of resetting said member includes discontinuing the current and biasing said member to said first position.

19. The method of claim 15 wherein said step of shrinking said wire includes heating said wire to a temperature above a transition temperature of said wire.

20. The method of claim 15 further including the steps of attaching an adjustment drum to said member, said adjustment drum having a diameter different from that of said member and wrapping said wire around said adjustment drum.

* * * * *